(12) United States Patent
White et al.

(10) Patent No.: US 8,080,180 B2
(45) Date of Patent: Dec. 20, 2011

(54) PREPARATION OF STABLE SILVER COLLOIDS

(75) Inventors: Peter Cyril White, Lincoln (GB); Jakob Howie Hjortkjaer, Copenhagen (DK)

(73) Assignee: The University of Lincoln (GB)

( * ) Notice: Subject to any disclaimer, the term of this patent is extended or adjusted under 35 U.S.C. 154(b) by 16 days.

(21) Appl. No.: 12/294,151

(22) PCT Filed: Mar. 21, 2007

(86) PCT No.: PCT/GB2007/050138
§ 371 (c)(1),
(2), (4) Date: Jan. 16, 2009

(87) PCT Pub. No.: WO2007/107792
PCT Pub. Date: Sep. 27, 2007

(65) Prior Publication Data
US 2009/0236570 A1    Sep. 24, 2009

(30) Foreign Application Priority Data

Mar. 23, 2006 (GB) .................................. 0605752.5

(51) Int. Cl.
*H01B 1/02* (2006.01)
*H01B 1/22* (2006.01)
(52) U.S. Cl. ........................................................ 252/514
(58) Field of Classification Search ................... 252/514
See application file for complete search history.

(56) References Cited

U.S. PATENT DOCUMENTS

| | | | | |
|---|---|---|---|---|
| 5,853,464 A | * | 12/1998 | Macpherson et al. | 106/31.6 |
| 6,051,614 A | * | 4/2000 | Hirai et al. | 516/20 |
| 2004/0234958 A1 | * | 11/2004 | Smith et al. | 435/6 |
| 2005/0142567 A1 | * | 6/2005 | Su et al. | 435/6 |
| 2005/0147963 A1 | * | 7/2005 | Su et al. | 435/5 |
| 2005/0191665 A1 | * | 9/2005 | Su et al. | 435/6 |
| 2009/0233237 A1 | * | 9/2009 | Yoshiki et al. | 430/311 |

OTHER PUBLICATIONS

P.C. Lee and D. Meisel, "Adsorption and Surface-Enhanced Raman of Dyes on Silver and Gold Sols", J. Phys. Chem., 86, 1982, 3391-3395.*

* cited by examiner

*Primary Examiner* — Douglas Mc Ginty
(74) *Attorney, Agent, or Firm* — Mark R. Malek, Esq.; Zies Widerman & Malek

(57) ABSTRACT

A method is described for producing highly stable silver colloidal solutions by reducing silver nitrate with lithium citrate. In the method, the main steps consist of: (a) heating a first quantity of water to a first predetermined temperature; (b) adding a second quantity of silver nitrate to the water; (c) heating the mixture to a second predetermined temperature; (d) adding a third quantity of an aqueous lithium citrate solution to the mixture; (e) maintaining the mixture at the second predetermined temperature for a predetermined time; and (f) cooling the mixture. The mixing process is accompanied by constant stirring. The colloid exhibits high light-scattering properties and intense SERS or SERRS spectra with low background fluorescence levels and a long shelf life, making it particularly suitable for Raman spectroscopy.

22 Claims, 3 Drawing Sheets

PREPARATION OF STABLE SILVER COLLOIDS

FIELD OF THE INVENTION

The present invention concerns methods of making stable silver colloids and to colloids produced by the method. The colloids are especially useful for Raman spectroscopy.

BACKGROUND TO THE INVENTION

Analytical chemists for many years did not use Raman spectroscopy because it failed to provide the sensitivity required for the detection of trace quantities of analytes. This was mainly because of very high background levels of fluorescence arising from either the sample or substrate which swamp the weak Raman signals. In 1974, Fleischman discovered, whilst using Raman spectroscopy to study the electrochemical reactions of pyridine on a silver electrode, that there was a tremendous enhancement of the pyridine Raman signals with the silver quenching a large amount of the background fluorescence. This surface enhancement could only be achieved if the silver surface was rough and not smooth.

Subsequently, it has been found that equal or even higher surface enhancement effects can be achieved with silver colloids. A colloid is a suspension of the metal particles in solution. In order to achieve the optimum effect, controlled aggregation of the silver colloid particles is required, typically using inorganic (e.g. chloride or nitrate) or organic (e.g. poly-L-lysine or spremine) compounds as aggregation reagents. For the majority of analytes, the colloidal silver particles should be about 20-50 nm, prior to aggregation, and have a narrow particle size distribution.

With the tremendous increase in sensitivity that can be achieved using this surface enhancement effects the analytical techniques of surface enhanced Raman scattering (SERS) spectroscopy and surface enhanced resonance Raman scattering (SERRS) spectroscopy have since been developed. The growth in the use of these techniques has been exponential but the major problem is producing stable colloids with good light scattering properties and capable of quenching background fluorescence. For a stable colloid the silver particles should remain suspended indefinitely but, on many occasions, aggregation occurs and the silver falls out of solution.

Silver colloids can be prepared by chemical reduction with either sodium borohydride or sodium citrate. Citrate reduced colloids are more stable and many analysts have prepared these using a method published by P. C. Lee and O. Meisel (J. Phys. Chem., 1982, 86, 3391-3395). Batch to batch reproducibility is difficult to achieve by this method and the stability, i.e. shelf life, is variable. Preparation requires the use of ultra clean glassware and accurately controlled temperatures, stirring speed, etc.

A published modification of the original method (C. H. Munro, W. E. Smith and P. C. White, Analyst 1993, Vol. 118, 733-735) has led to some improvements in the properties of the silver colloid but long term stability can still be a problem. For a commercial product, however greater stability is still required and studies have shown that even the material used in the storage container can affect the stability of some batches of silver colloids.

Silver colloids prepared according to these known prior methods produce silver particles with a negative citrate layer on their surface, and for maximum surface enhancement effects analytes must be in close proximity to the aggregated silver surface. For cationic analytes this can be achieved as they are attracted to the negatively charged silver surface. With anionic analytes only a very weak SER(R)S effect is achieved due to repulsion from the silver surface. The authors of the modified colloid preparation method resolved this problem by using poly-L-lysine as the aggregation agent, but adding ascorbic acid to control pH and protonate the aggregating agent, which then acted as a bridge between the colloid surface and the analyte.

In the search to achieve stable silver colloids with good light scattering properties, other methods of preparation have been studied by the Applicant. As a result of these studies a novel method, based upon knowledge of the chemical properties of inorganic materials, has resulted in producing stable silver colloid solutions which have the desired analytical properties.

SUMMARY OF THE INVENTION

In accordance with the present invention, a method for producing a silver colloidal solution comprises reducing silver nitrate with lithium citrate.

The invention also provides a silver colloid solution made by reducing silver nitrate with lithium citrate.

The method preferably includes the steps of (a) heating a first quantity of water to a first predetermined temperature; (b) adding a second quantity of silver nitrate to the water; (c) heating the mixture to a second predetermined temperature; (d) adding a third quantity of an aqueous lithium citrate solution to the mixture; (e) maintaining the mixture at the second predetermined temperature for a predetermined time; and (f) cooling the mixture.

The mixing process is conveniently carried out in a three-necked container.

In the method, preferably the first predetermined temperature is 45° C., the second predetermined temperature is 98° C., the first quantity is 500 ml of high purity water, the second quantity is 90 mg of silver nitrate of 99.99:99% purity, the third quantity is 10 ml of aqueous lithium citrate solution, the aqueous lithium citrate solution comprises 227 mg of lithium citrate in 25 ml high purity water, and the water and the mixture are stirred constantly throughout steps (a) to (f). The predetermined time is preferably 90 minutes.

BRIEF DESCRIPTION OF THE DRAWING

Preferred embodiments of the invention will now be described with reference to the accompanying drawing, in which.

DETAILED DESCRIPTION OF THE ILLUSTRATED EMBODIMENTS

Figure 1:
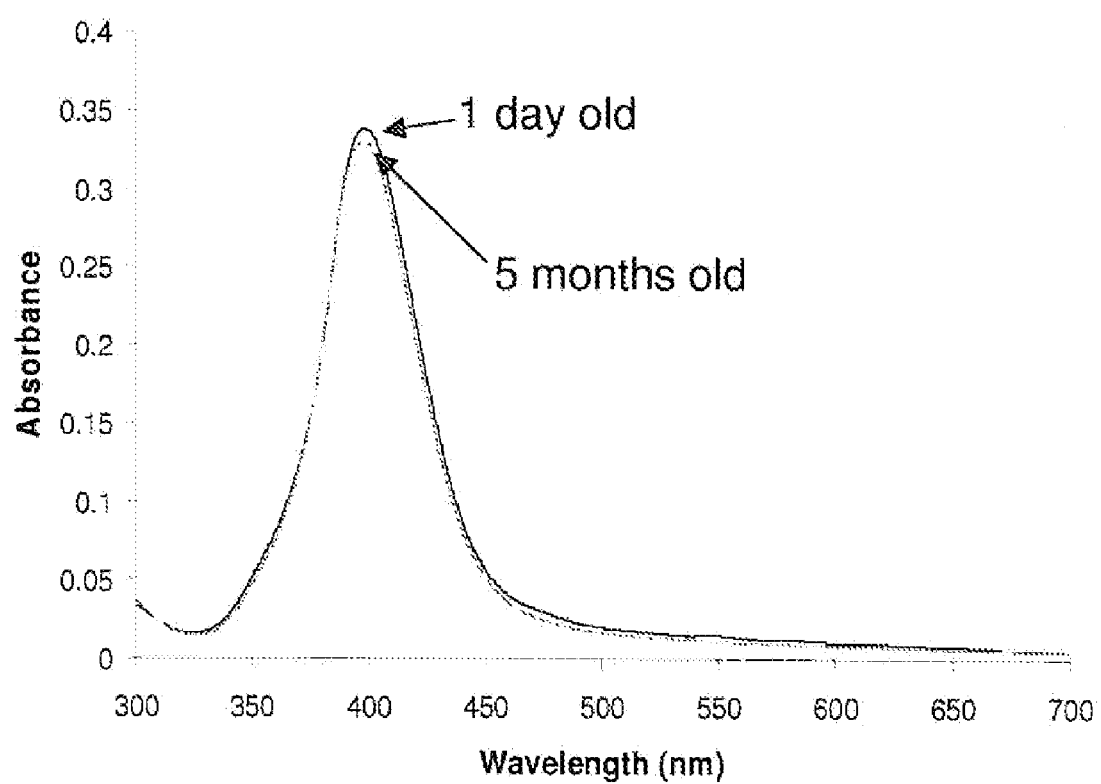
FIG. 1 is the UV/visible spectrum showing stability of a silver colloid produced by a method in accordance with the invention.

In considering the chemical properties of sodium (used in the form of sodium citrate) to reduce silver nitrate to produce the colloid, as in the prior art, it was believed that the ionic nature of sodium is responsible for the difficulty in producing colloidal particles, which leads to the de-stabilisation of the colloidal solution.

Lithium heads the Group 1 elements and displays some very different properties to sodium. Lithium is very electropositive and, as a result of its small atomic radius, has a high electrostatic charge and hence high salvation energy. Additionally, lithium compounds tend to form covalent as opposed to ionic bonds and, furthermore, lithium is much larger compared to sodium when hydrated. It was therefore considered by the Applicant that these properties could provide smaller particle size silver colloids and better stability in containers made of various different materials, which had proved troublesome in the past.

Prior attempts at producing silver colloids were disappointing and there was little encouragement to go against the perceived wisdom that the ionic nature of sodium in silver nitrate (discussed above) was responsible for failed attempts at obtaining silver colloids with a long enough shelf life/stability.

However, it has now been discovered by the Applicant that the traditional sodium can be replaced with lithium. Initial experiments using lithium citrate to reduce silver nitrate proved promising. Batches of colloid produced using these materials were found to have superior scattering properties (more intense Raman signals—indicating smaller particle size and better particle size distribution), considerably reduced background fluorescence from analytes (indicating an enhanced level of fluorescence quenching), and good stability.

These batches of colloid have remained stable, i.e. the silver particles are still in suspension, over a protracted period. Recent tests have confirmed that the particles are still dispersed. When compared with more recent samples of sodium citrate colloids, the old lithium citrate silver colloid samples still display superior light scattering properties, i.e. more intense SERBS spectra, as compared to silver colloids produced according to the prior art using sodium citrate as the reducing agent.

It was also established that many of the silver colloids produced using sodium citrate could only be used if inorganic aggregating agents were used, with the majority failing to work with organic aggregating reagents. However, with the lithium citrate colloids, controlled aggregation could be obtained with either organic or inorganic aggregating agents. This last observation, together with the improved stability, clearly indicates that it is the use of lithium that is playing a major role in controlling the chemical properties of the silver colloid particles.

The method of preparing these lithium citrate-reduced colloidal solutions will now be described.

Method for Preparation of Stable Silver Colloidal Solutions

High purity water (500 ml-BDH; 18 mΩ) was put in a three-necked, one litre, round-bottomed flask. A glass stirring rod, passing through the central neck, was attached to an overhead stirrer motor, which was set at a stirring speed of 550 rpm. A thermometer (range 0-110° C.) was held in one of the side necks of the flask. Whilst stirring, the water temperature was raised and, on reaching 45° C., silver nitrate (90 mg-99.9999%; Aldrich Chemicals) was added through the third neck of the flask. The temperature of the contents of the flask was raised quickly to 98° C. and then 10 ml of aqueous lithium citrate solution (227 mg in 25 ml BDH high purity water) was added to the reaction mixture.

Stirring was maintained at this temperature for a further 90 minutes and then the heat was removed. The colloidal solution was allowed to cool to room temperature and continually stirred during this period.

The resulting silver colloidal solution exhibits a narrow size distribution, and is highly stable in glass and a wide range of other polymeric container materials, In addition, the silver colloidal solution exhibits high light-scattering properties and particularly intense SERS and SERRS spectra with very low fluorescence background levels. The silver colloidal solution can be aggregated with either organic or inorganic aggregating reagents of the kind used in Raman spectroscopy. Above all, the silver colloidal solution is incredibly stable and has a long shelf life.

FIG. 1 shows a graph of the UV/visible spectrum of a silver colloid prepared by the method described. UV/visible spectroscopy provides a method for characterisation of the silver colloid. Measurement of band width at half peak height gives an indication of the particle size distribution of the colloid particles—more uniform particle size leads to the narrower band width. Values of typically 60-70 nm are obtained for sodium citrate reduced colloids, and these give reasonable SERRS properties, but with lithium citrate reduced colloids below 60 nm have been obtained. The band width for the example described is 46 nm.

The $\lambda_{max}$ value is related to the particle size distribution and scattering properties of the colloid. Colloids with a value of 390-400 nm have been found to give the best SERRS properties, and with sodium citrate reduced colloids it is often difficult to achieve below 400 nm; the typical range is 400-410 nm. The $\lambda_{max}$ value for the example described is 399 nm.

Most sodium citrate reduced colloids produce an absorbance value in the range 0.25 to 0.30 at the $\lambda_{max}$ of the colloid, and this decreases quickly over 3-6 months on storage. Absorbance is an indication of the concentration of silver particles and generally, the higher the absorbance, the higher the intensity of a SERRS signal. With lithium citrate reduced colloids, absorbance values above 0.30 are obtained. The absorbance value for the example described is 0.36.

FIG. 1 also shows that there is virtually no change in the spectroptometric properties over a period of 5 months, thus indicating the stability of silver colloids produced according to the invention. Batches of these colloids have found to be stable over this extended period in glass and containers made of polymeric materials including, high and low density polyethylene, polypropylene and polyethylene terephthalate.

Figure 2:
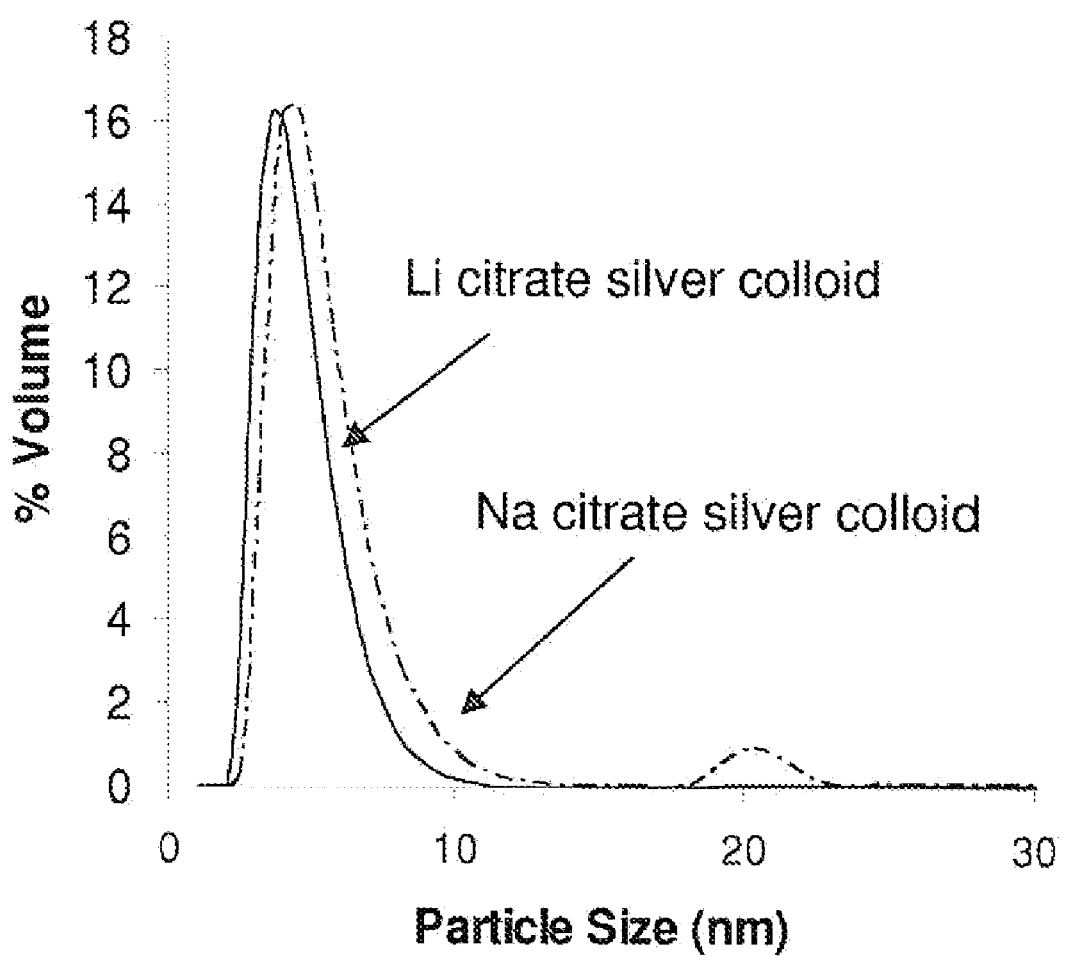
FIG. 2 is a graph showing particle size analyses of lithium and sodium citrate sliver colloids.

Particle size analysis of a silver colloid produced in accordance with the invention as shown in FIG. 2 indicate that, in comparison with a silver colloid produced by the method described in the prior art, the former has a narrower distribution of particles of smaller with similar mean particle size (4 nm compared with 4.5 nm) but with no significant number of particles greater than 11 nm. However, the sodium citrate silver colloid shows another distribution of particles in the range of 18-23 nm, The differences observed here account for the higher absorbance value, lower bandwidths and lower $\lambda_{max}$ values observed in the visible spectra of lithium citrate silver colloids ie., a larger number of smaller colloidal silver particles with a more uniform particle size being produced. These are properties of a silver colloid that on aggregation would be expected to produce a more intense surface scattering effect and hence stronger SERRS signals. Furthermore, with the colloids produced in accordance with the invention, their superior stability over sodium citrate silver colloids can be attributed to their uniformity of particle size and distribution.

Figure 3:
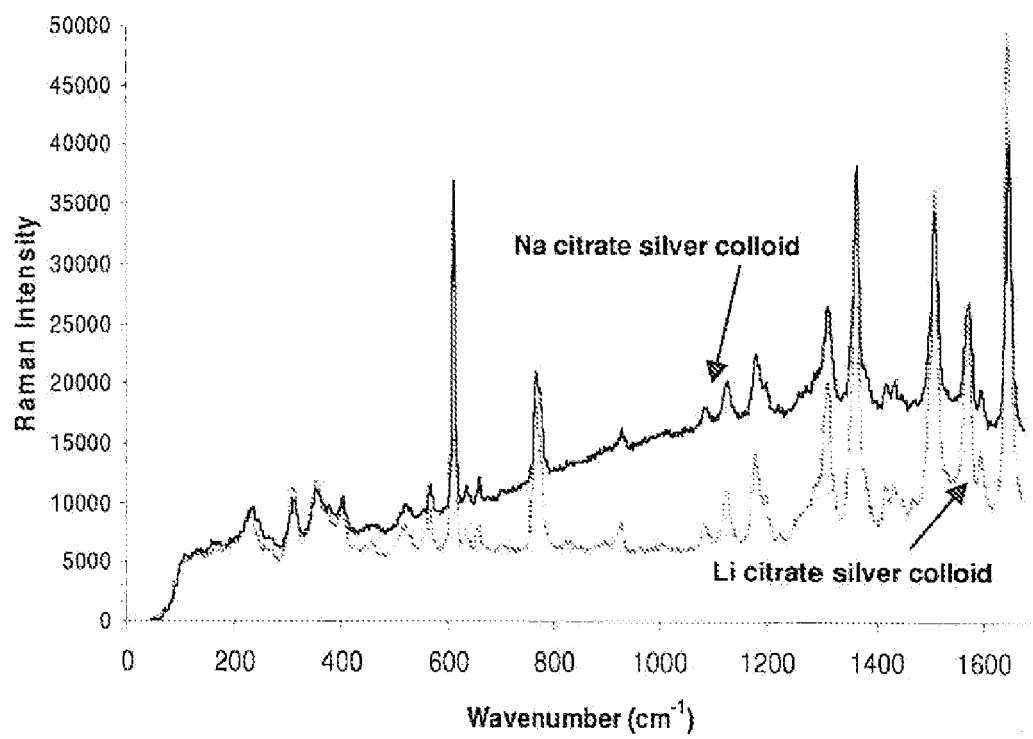
FIG. 3 is a graph of Raman intensity against wave number comparing a lithium citrate and a sodium citrate silver colloid used for the SERRS analysis of Rhodamine 6G.

The silver colloid solution produced in accordance with the invention, as predicted above, does produce intense SERS and SERRS spectra. With Rhodamine 6G, a dye standard commonly used for assessing SERFS activity of colloids, a colloid should be able to produce strong SERRS spectra from a $10^{-9}$ M solution of the dye by using an aggregating agent which is either inorganic, such as sodium chloride, or organic, for example poly-L-lysine. These criteria are met by the silver colloid produced by the method of the invention, and FIG. 3 provides a SERRS spectrum of the dye (lower trace) which has been obtained using sodium chloride as the aggregating reagent at an optimal concentration of 0.0125M. The upper trace in FIG. 3 shows the SERRS spectrum achieved using a sodium citrate silver colloid under the same optimal analytical conditions. These results show the significant reduction in background fluorescence and the increased sensitivity that can be achieved with silver colloids produced according to the method described in this invention. Using accurately background subtracted data from these spectra an increase in the intensity of nearly 70% for the most intense band at 1650 $cm^{-1}$ can be achieved.

That which is claimed is:

1. A method for producing a silver colloidal solution by reducing silver nitrate with lithium citrate.

2. A method as claimed in claim 1, comprising the steps:
   (a) heating a first quantity of water to a first predetermined temperature;
   (b) adding a second quantity of silver nitrate to the water;
   (c) heating the mixture to a second predetermined temperature;
   (d) adding a third quantity of an aqueous lithium citrate solution to the mixture;
   (e) maintaining the mixture at the second predetermined temperature for a predetermined time; and
   (f) cooling the mixture.

3. A method as claimed in claim 2, wherein the mixing process is carried out in a three-necked container.

4. A method as claimed in claim 2, wherein the first predetermined temperature is 45° C.

5. A method as claimed in claim 4, wherein the second predetermined temperature is 98° C.

6. A method as claimed in claim 2, wherein the first quantity is 500 ml of high purity water.

7. A method as claimed in claim 2, wherein the second quantity is 90 mg of said silver nitrate of 99.9999% purity.

8. A method as claimed in claim 2, wherein the third quantity is 10 ml of said aqueous lithium citrate solution.

9. A method as claimed in claim 8, wherein the aqueous lithium citrate solution comprises 227 mg of lithium citrate in 25 ml high purity water.

10. A method as claimed in claim 2, wherein the water and the mixture are stirred constantly throughout steps (b) to (f).

11. A method as claimed in claim 10, wherein the stirring is carried out using a stirrer rotated at 550 rpm.

12. A method as claimed in claim 2, wherein in step (e) the predetermined time is 90 minutes.

13. A method as claimed in claim 1, wherein the resultant silver colloid has a narrow particle size distribution.

14. A method as claimed in claim 13, wherein the mean particle size is 4 nm.

15. A method as claimed in claim 2, wherein the resultant silver colloid has a narrow particle size distribution.

16. A method as claimed in claim 15, wherein the mean particle size is 4 nm.

17. A method as claimed in claim 2, wherein the resultant silver colloidal solution is aggregated with organic or inorganic aggregating reagents for use in SERS and SERRS spectroscopy.

18. A silver colloidal solution formed by the reduction of silver nitrate with lithium citrate.

19. A silver colloidal solution as claimed in claim 18, having high light-scattering properties and producing intense SERS and SERRS spectra.

20. A silver colloidal solution as claimed in claim 18, wherein the mean particle size is 4 nm.

21. A silver colloidal solution as claimed in claim 18, wherein the resultant silver colloid has a narrow particle size distribution.

22. A silver colloidal solution as claimed in claim 21, wherein the mean particle size is 4 nm.

* * * * *